US012805534B2

(12) United States Patent
Hall et al.

(10) Patent No.: US 12,805,534 B2
(45) Date of Patent: Nov. 24, 2026

(54) CAM PLATE WITH DEPTH LIMITER FOR POWER OPERATED ROTARY KNIFE

(71) Applicant: Bettcher Industries, Inc., Birmingham, OH (US)

(72) Inventors: Joel L. Hall, North Ridgeville, OH (US); Austen J. Gray, Amherst, OH (US); Kevin V. Stump, Wellington, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 19/284,437

(22) Filed: Jul. 29, 2025

(65) Prior Publication Data

US 2026/0026516 A1 Jan. 29, 2026

Related U.S. Application Data

(60) Provisional application No. 63/676,719, filed on Jul. 29, 2024.

(51) Int. Cl.
*A22B 5/00* (2006.01)

(52) U.S. Cl.
CPC .................................. *A22B 5/0047* (2013.01)

(58) Field of Classification Search
CPC ........ A22B 5/0047; A22C 17/12; B26D 5/16; B26D 7/18; F16C 17/10; B25F 5/00
(Continued)

(56) References Cited

U.S. PATENT DOCUMENTS 4,854,046 A * 8/1989 Decker ................. B26B 25/002 30/286
5,692,307 A * 12/1997 Whited ................. B26B 25/002 30/276

(Continued)

FOREIGN PATENT DOCUMENTS

CN 102092050 A 6/2011
DE 197 41 343 A1 9/1998

OTHER PUBLICATIONS

International Search Report and Written Opinion dated Dec. 1, 2025 for PCT International Patent Application No. PCT/US2025/039761, PCT Filing Date Jul. 29, 2025. The PCT '761 patent application claims priority from the present application. (13 pages).

*Primary Examiner* — Richard T Price, Jr.
(74) *Attorney, Agent, or Firm* — Watts Law LLC; George L. Pinchak, Esq.

(57) ABSTRACT

A cam plate for a cam mechanism of a hand-held, power operated rotary knife. The cam plate includes a cam member engaging a split blade housing of the power operated rotary knife and being operable to change a configuration of the split blade housing between a first, blade-supporting state and a second, blade-changing state. The cam plate includes a cam cover for maintaining engagement of the cam member with the split blade housing. The cam cover includes first and second lateral sides. The cam plate further includes a depth limiter having a support portion and a working portion. A lower or carcass-contacting surface of the working portion The support portion includes first and second sections extending from respective opposite ones of the first and second lateral sides of the cam cover. The working portion includes an arcuate section, a lower surface of the working portion being spaced below a lower surface of the cam cover.

20 Claims, 11 Drawing Sheets

(58) Field of Classification Search
USPC .......................................................... 452/134
See application file for complete search history.

(56) References Cited

U.S. PATENT DOCUMENTS

| | | | | |
|---|---|---|---|---|
| 7,670,212 | B1 | 3/2010 | Thompson et al. | |
| 8,752,299 | B2 | 6/2014 | Rosu et al. | |
| 8,806,761 | B2 | 8/2014 | Whited et al. | |
| 8,893,391 | B2 * | 11/2014 | Levsen .................. | A22C 17/12<br>452/133 |
| 9,592,076 | B2 | 3/2017 | Esarey et al. | |
| 10,124,500 | B2 | 11/2018 | Whited et al. | |
| 10,343,296 | B2 | 7/2019 | Hall et al. | |
| 10,471,614 | B2 | 11/2019 | Whited et al. | |
| 11,529,166 | B2 | 12/2022 | Esarey et al. | |
| 2003/0084576 | A1 * | 5/2003 | Whited ................ | A22B 5/0064<br>30/276 |
| 2004/0187316 | A1 | 9/2004 | Whited et al. | |
| 2018/0162002 | A1 | 6/2018 | Whited et al. | |

* cited by examiner

CAM PLATE WITH DEPTH LIMITER FOR POWER OPERATED ROTARY KNIFE

CROSS-REFERENCE TO RELATED APPLICATION

The present application claims priority under 35 U.S.C. § 119 (e) to U.S. Provisional Patent Application Ser. No. 63/676,719, filed Jul. 29, 2024, entitled Cam Plate With Depth Limiter for Power Operated Rotary Knife. The above-identified U.S. provisional patent application is incorporated by reference herein in its entirety for any and all purposes.

TECHNICAL FIELD

The present disclosure relates to a cam plate with a depth limiter for a hand-held, power operated rotary knife and, more specifically, to a cam plate with a depth limiter that is integral with and extends from a cam cover of the cam plate, the cam plate being part of a cam mechanism used for changing a split blade housing of a hand-held, power operated rotary knife between a first, blade-supporting state and a second, blade-changing state.

BACKGROUND

Hand-held, power operated rotary knives are widely used in various food processing operations for, among other things, cutting and trimming fat from an animal carcass. A power operated rotary knife includes a power-driven rotary knife blade that is supported for rotation about a blade axis of rotation by a blade housing. The rotary knife blade and blade housing are part of a head assembly of the power operated rotary knife. A handle assembly extends rearwardly from the head assembly and includes a handle that is gripped by an operator, allowing the operator to manipulate the rotary knife blade for cutting and trimming purposes. In one type of power operated rotary knife, the blade housing is a split blade housing, allowing for expansion of a diameter of the blade support section of the blade housing for insertion and removal of a rotary knife blade from the blade housing. That is, a diameter of the blade support section of the blade housing is changeable between a first, smaller diameter, blade supporting condition or state and a second, larger diameter, blade-changing condition or state. The split blade housing, in turn, affixed to and supported by a frame body of the power operated rotary knife. A drive mechanism of the power operated rotary knife extends through or is disposed within the handle assembly and is operatively coupled to engage the rotary knife blade and rotatably drive the blade about the blade axis of rotation.

During the course of a work shift wherein a power operated rotary knife may be used for cutting and/or trimming operations on a high volume of animal carcasses, it is periodically necessary to remove the rotary knife blade from the blade housing for sharpening of the blade cutting edge or, if the blade has reached the end of its operational life, for replacement of the blade with a new rotary knife blade. To facilitate removal of the rotary knife blade from a split blade housing, a cam mechanism may advantageously be provided to facilitate the removal of the rotary knife blade from the blade support section of the blade housing and insertion of a sharpened or new rotary knife blade into the blade support section of the blade housing, while the blade housing is maintained in its expanded diameter, blade-changing state or condition. In one type of cam mechanism, a cam member, operably coupled to the blade housing, is rotatable between two positions. In a first position of the cam member, the cam member engages the split blade housing to maintain the blade housing in the first, blade-supporting state, while in a second position of the cam member, the cam member engages the split blade housing to maintain the blade housing in the second, blade-changing state. This second position of the cam member allows for removal and insertion of a rotary knife blade from the split blade housing when the blade housing is in the second, blade-changing state. U.S. Pat. No. 10,124,500 to Whited et al, issued Nov. 13, 2018, and U.S. Pub. No. US 2023-0053515 A1 to Thompson et al., published Feb. 23, 2023, disclose cam mechanism for power operated rotary knives having split blade housings. Both U.S. Pat. No. 10,124,500 and U.S. Pub. No. US 2023-0053515 A1 are assigned to the assignee of the present application and both are incorporated by reference herein in their respective entireties.

SUMMARY

In one aspect, the present disclosure relates to a cam plate for a cam mechanism including a cam member engaging a split blade housing of a power operated rotary knife and operable to change a configuration of the split blade housing between a first, blade-supporting state and a second, blade-changing state, the cam plate comprising: a cam cover for maintaining engagement of the cam member with the split blade housing, the cam cover including first and second lateral sides; and a depth limiter including a support portion having first and second sections extending from respective opposite ones of the first and second lateral sides of the cam cover and a working portion including an arcuate section, a lower surface of the working portion being spaced below a lower surface of the cam cover.

In another aspect, the present disclosure relates to a power operated rotary knife comprising: a rotary knife blade including a cutting edge; a split blade housing supporting the rotary knife blade for rotation about a blade axis of rotation, the blade housing being selectively changeable between a first, blade-supporting state and a second, blade changing state; and a cam mechanism including a cam member and a cam plate, the cam member engaging a mounting section of the split blade housing, the cam member being operable to change a configuration of the split blade housing between the first, blade-supporting state and the second, blade-changing state, the cam plate including: a cam cover for maintaining engagement of the cam member with the split blade housing, the cam cover including first and second lateral sides; and a depth limiter including a support portion extending from the cam cover and a working portion including an arcuate section, a lower surface of the working portion being spaced radially outwardly of the cutting edge of the rotary knife blade and below the cutting edge of the rotary knife blade. In another aspect, the present disclosure relates to a depth limiter for a power operated rotary knife having a cam mechanism, the cam mechanism including a cam plate that positions and maintains a cam member of the cam mechanism for engagement with a mounting section of a split blade housing. In one example embodiment, the depth limiter is integral with and extends from the cam plate. The depth limiter includes an arcuate portion spaced radially outwardly of and having a lower surface that is spaced axially downwardly from a cutting edge of a rotary knife blade of the power operated rotary knife.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
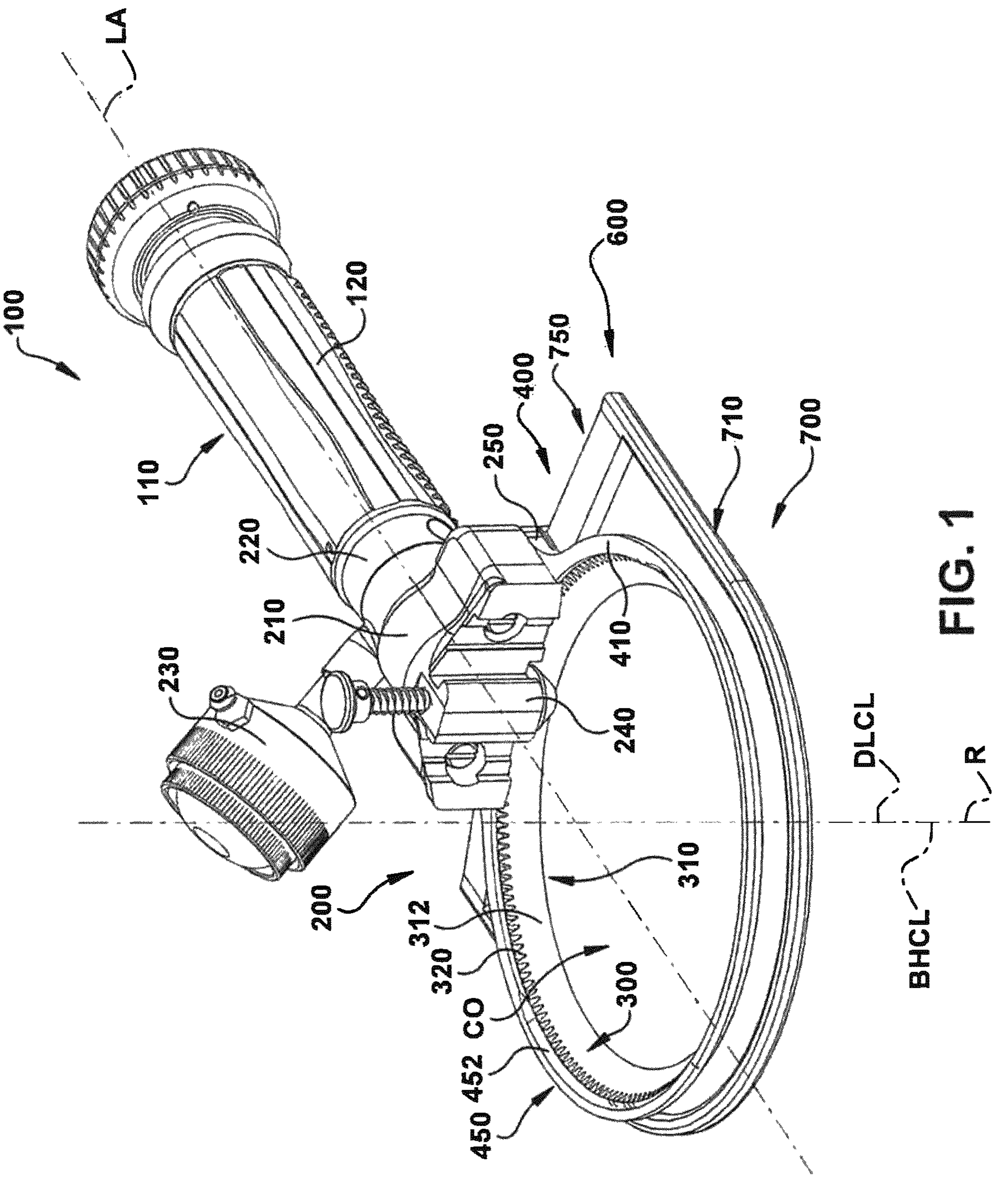
FIG. 1 is a schematic top, front perspective view of a hand-held, power operated rotary knife of the present disclosure including a split blade housing rotatably supporting a power driven rotary knife blade and a cam mechanism for changing a diameter of the split blade housing to facilitate changing of the rotary knife blade, the cam mechanism including a cam plate with depth limiter for limiting a depth of cut of the rotary knife blade.

In one exemplary or example embodiment, the present disclosure relates to a hand-held, power operated rotary knife 100 including a cam mechanism 500 having a cam plate 600 with an integral depth limiter 700. Advantageously, the depth limiter 700 functions to limit a depth of cut DC of a power driven rotary knife blade 300 of the power operated rotary knife 100 and is configured so as to not impede or obstruct a central opening CO defined by the aligned inner wall surfaces 312, 452 of the rotary knife blade 300 and associated split blade housing 410. That is, a generally C-shaped working portion 710 of the depth limiter 700 is spaced radially outwardly from and axially below a cutting edge path or circle defined by a cutting edge 310 of the rotary knife blade 300 and, thus, the working portion 710 does not obstruct the generally upward flow direction of cut or severed material (tissue, fat, meat, etc.) through the central opening CO after the severed material has been cut or trimmed from, for example, an animal carcass by the cutting edge 310 of the rotating rotary knife blade 300. As used herein, the directions forward FW, rearward RW, vertically or axially upward UP, vertically or axially downward DW, laterally to the right LR and laterally to the left LL will be in accord with the directions depicted in FIGS. 3-5 or movement or direction generally parallel to the directions shown.

Additionally and advantageously, because a support portion 750 of the depth limiter 700 extends from but does not overlap or overlie a central cam support or cam cover 610 of the cam plate 600, there is no increase in an axial height of the cam plate 600 in a region of the cam cover 610. Thus, unlike a situation where the depth limiter 700 was a separate "add on" piece or component that overlayed the cam cover 610 and therefore would necessarily increase the effective axial height (in the downward direction DW) of the cam mechanism 500, which is undesirable, the depth limiter 700 of the present disclosure eliminates the necessity of an "add on" component and maintains the same axial dimension of a cam plate with no depth limiter in the region of the cam cover 610.

The depth limiter 700 is advantageous in a number of cutting/trimming tasks/situations wherein there is a desire to limit depth of cut of the rotary knife blade 300. One such example is so-called hot defatting of beef carcasses wherein, after hide removal, outer fat tissue can be efficiently removed with the power operated rotary knife 100 utilizing the depth limiter 700, without the need for cooling the carcass prior to removing the outer layer of fat tissue. Enabling hot defatting of beef carcasses represents a significant cost savings for beef processing plants. Additionally, the depth limiter 700, by limiting the depth of cut DC of the blade cutting edge 310, mitigates the problem of cutting into or gouging the desirable lean meat portion of the carcass while performing the hot defatting function and thereby advantageously increases the yield of desirable meat. The outer layer of fat in a hot (non-cooled) beef carcass tends to be gelatinous and resilient. In the depth limiter 700, a generally C-shaped working portion 710 of the depth limiter 700 includes a downward facing, lower, generally planar contacting surface 712 that contacts the carcass and pushes down through the gelatinous, outer layer of the non-cooled fat until the lower or contacting surface 712 bears against or in proximity to a denser lean meat surface that lies below the fat layer. Thus, the operator manipulates the power operated rotary knife 100 such that at least a part of the working portion 710 of the depth limiter 700 pushes downwardly though the hot fat until the lower, planar contacting surface 712 of the working portion 710 of the depth limiter 700 pushes against the lean meat surface below the fat layer. Being gelatinous and reliant, the outer layer of hot fat adjacent the lower or contacting surface 712 of the working portion 710 springs upwardly toward the cutting edge 310 of the rotating blade 300 and, thus, the fat layer is effectively severed, at the desired depth of cut DC. At the same time, the working portion 710 of the depth limiter 700 advantageously prevents the lean meat below the fat layer from being gouged or cut into by the cutting edge 310 of the rotary knife blade 300.

Figure 3:
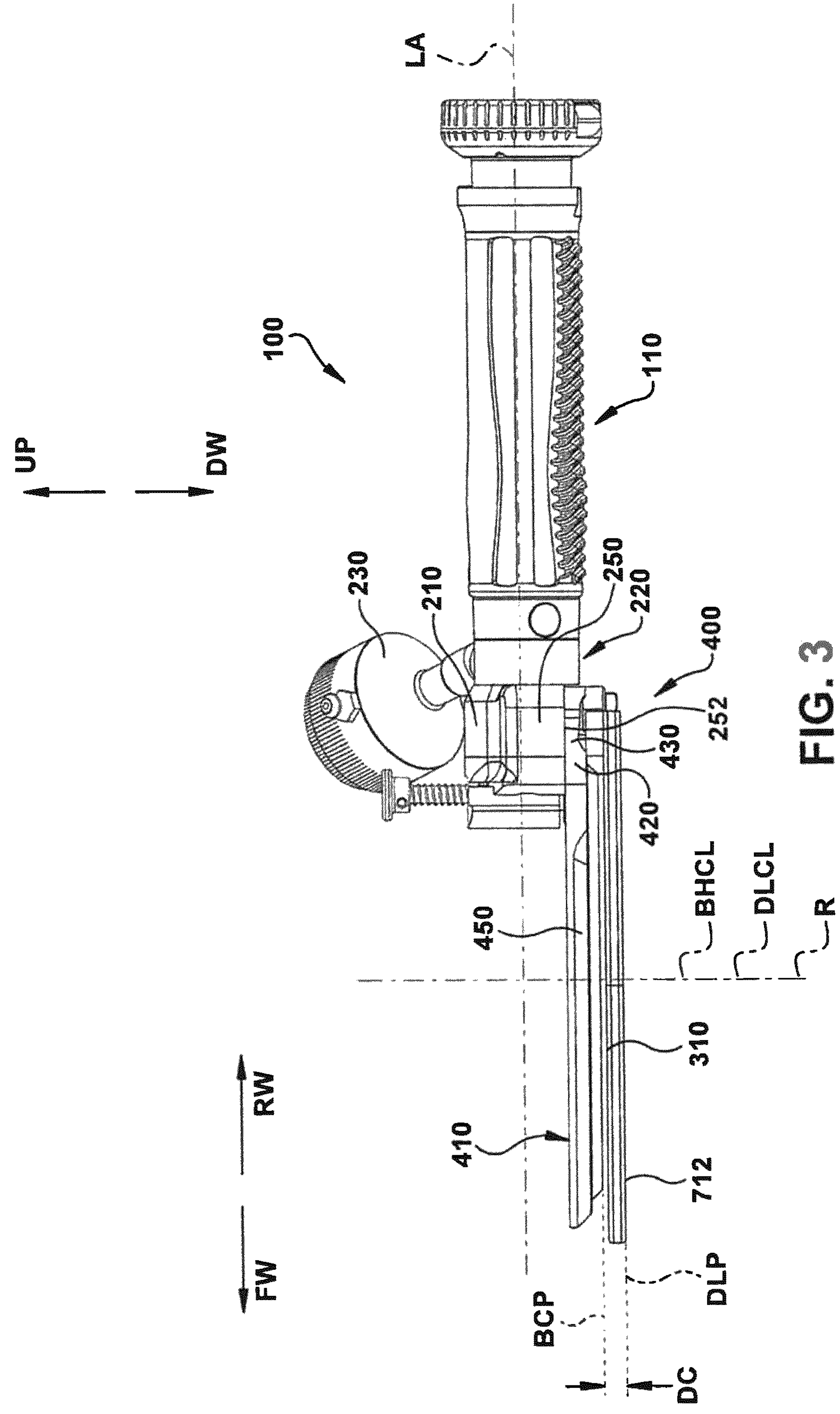
FIG. 3 is a schematic side elevation view of the power operated rotary knife of FIG. 1.
Figure 5:
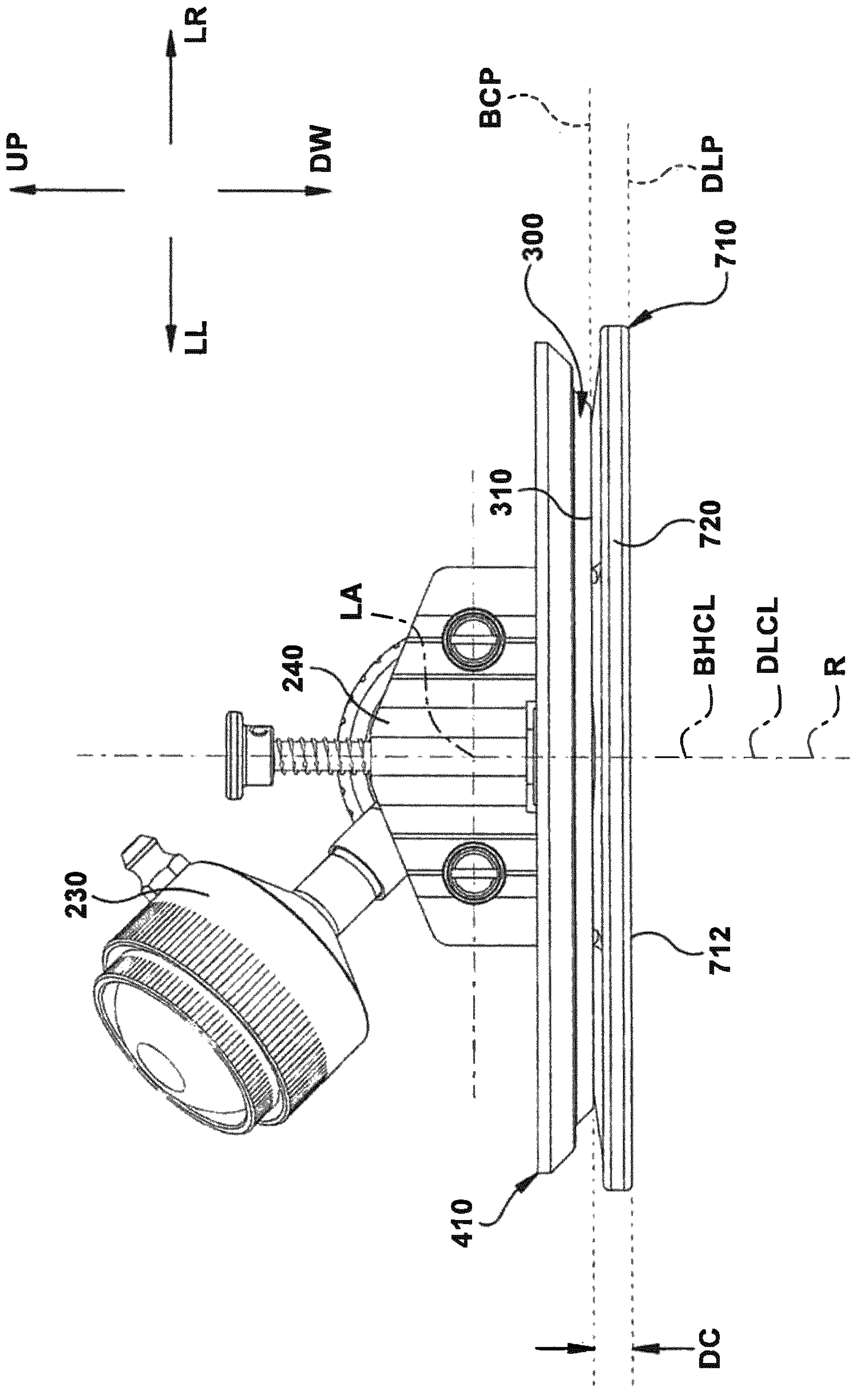
FIG. 5 is a schematic front elevation view of the power operated rotary knife of FIG. 1.
Figure 6:
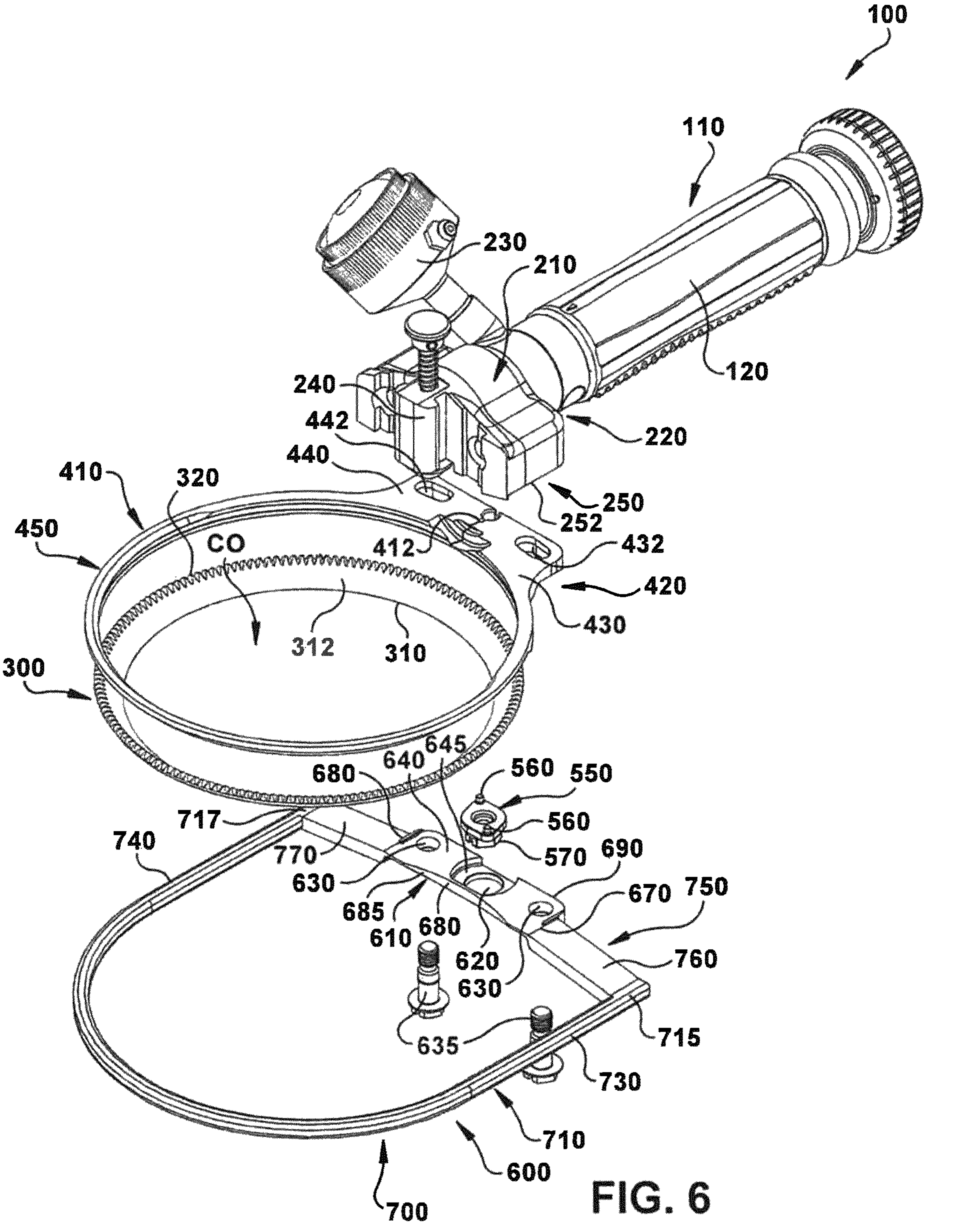
FIG. 6 is a schematic top, front exploded perspective view of the power operated rotary knife of FIG. 1.
Figure 7:
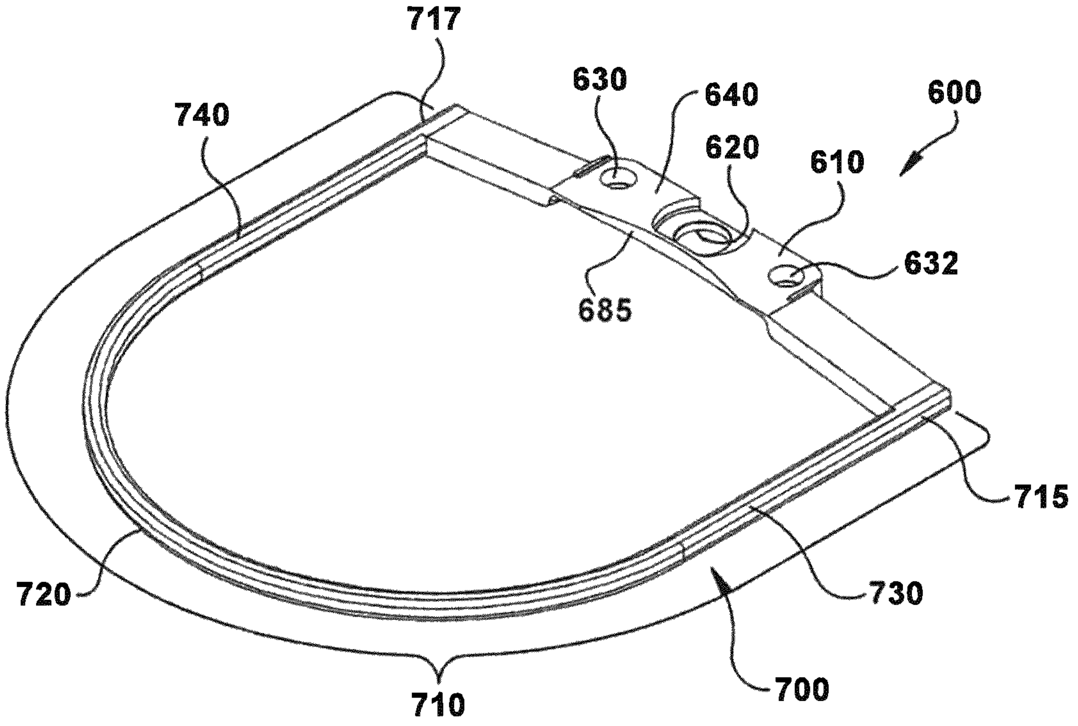
FIG. 7 is a schematic top, front perspective view of one example embodiment of a cam plate with depth limiter of the present disclosure which is part of the cam mechanism of the power operated rotary knife of FIG. 1.
Figure 8:
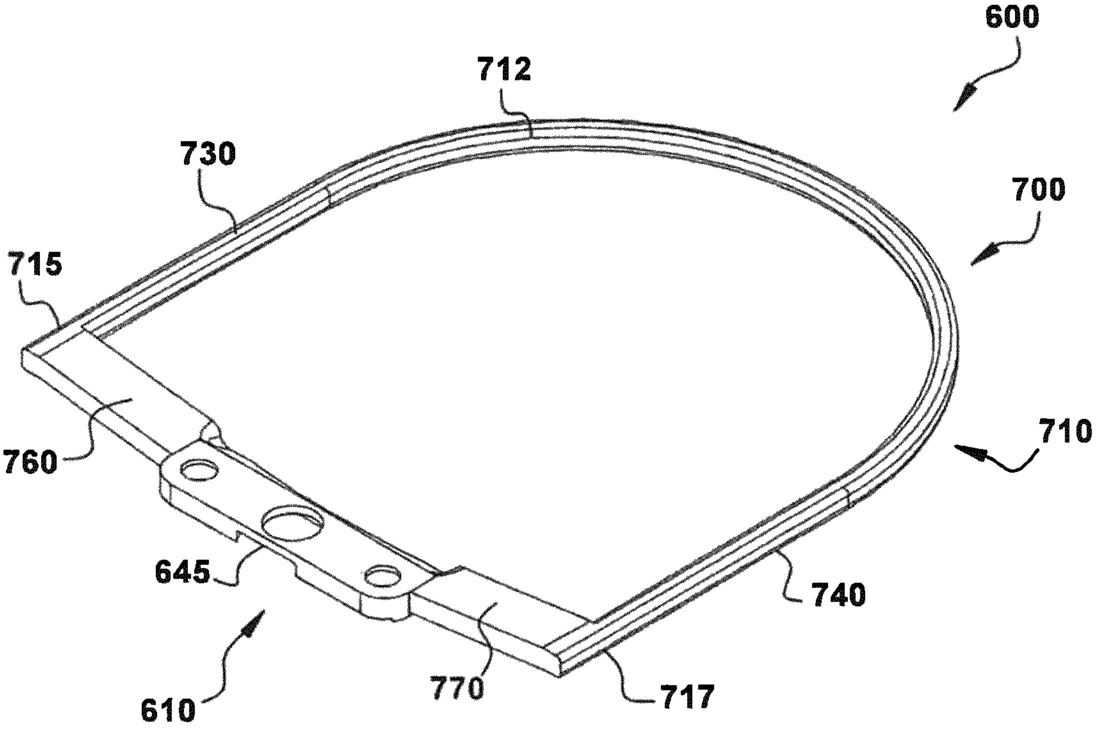
FIG. 8 is a schematic top, rear perspective view of the cam plate with depth limiter of FIG. 7.

As schematically depicted in FIGS. 3 & 5, the depth of cut DC can be understood as the axial difference (difference in height with respect to vertical) between the cutting plane BCP defined by the blade cutting edge 310 and a depth limiter plane DLP defined the lower or contacting surface 712 of the C-shaped working portion 710 of the depth limiter 700. In one example embodiment, the depth of cut DC is approximately 0.25 inches. However, depending on the characteristics of the carcasses to be processed, other depth of cuts are contemplated and without the scope of the present disclosure, for example, and without limitation, ⅛ inches and ⅜ inches. It should be appreciated, of course, that hot defatting of beef carcasses is just one example of an advantageous use or application of the power operated rotary knife 100 with depth limiter 700 of the present disclosure. Other uses and applications of the power operated rotary knife 100 wherein a desired depth of cut is sought would be appreciated by those of skill in the art. Such advantageous applications of the power operated rotary knife 100 with depth limiter 700 of the present disclosure would include meat processing industries, food processing industries, as well as other industries.

In one example embodiment, the power operated rotary knife 100 includes a longitudinally extending handle assembly 110 extending in the rearward direction RW from a head assembly 200. The handle assembly 110 extends along a longitudinal axis LA and includes an internal through bore which receives a drive mechanism. A pinion gear of the drive mechanism engages a driven gear or set of gear teeth 320 of the rotary knife blade 300 to thereby drive or rotate the rotary knife blade 300 about a blade central axis of rotation R. The handle assembly 110 further includes an outer gripping portion or handle 120 with is grasped by an operator to manipulate the power operated rotary knife 100 and thereby perform desired cutting/trimming operations. The head assembly 200 includes a frame body 210 which provides a support platform for the other components of the power operated rotary knife. Like the handle assembly 110, the frame body 210 also includes a through bore or passageway to allow the drive mechanism to engage the rotary knife blade driven gear 320. A rearward portion of the frame body 210 includes a handle interface 220 for receiving and supporting the handle assembly 110. The handle interface 220 of the frame body also supports a lubrication assembly 230. The operator can periodically actuate the lubrication assembly 230 to provide lubrication to drive mechanism components, including the pinion gear that drives the rotary knife blade 300. A forward portion of the frame body 210 receives and supports a steeling assembly/pinion gear cover 240. The steeling assembly can be actuated by the operator to straighten the cutting edge 310 of the rotary knife blade 300. While steeling is different than and does not obviate the need to periodically sharpen the blade 300, steeling can, if properly utilized, increase the time between required blade sharpenings.

A lower portion of the frame body 210 defines a generally planar mounting pedestal 252. The mounting pedestal 252 provides a seating region for affixing a blade housing assembly 400 to the frame body 250. The blade housing assembly 400 includes the split blade housing 410 and the associated cam mechanism 500. In one example embodiment, the split blade housing 410 includes a split 412 that extends through a mounting section 420 and through a generally circular blade support section 450, which rotatably supports the rotary knife blade 300 for rotation about its axis of rotation R. The split 412 of the blade housing 410 allows for expansion of a diameter of the blade support section 450 when removing the rotary knife blade 300 from the blade housing blade support section 450 is required for sharpening or replacement of the blade 300. The mounting section 420 is designed and configured for mounting to the mounting pedestal 252 of the frame body 250. When the mounting section 420 of the blade housing 410 is mounted to the frame body mounting pedestal 252, the rotary knife blade 300 is presented to the drive mechanism such that the pinion gear of the drive mechanism can engage and rotate the blade 300 upon actuation of the drive mechanism.

Figure 4:
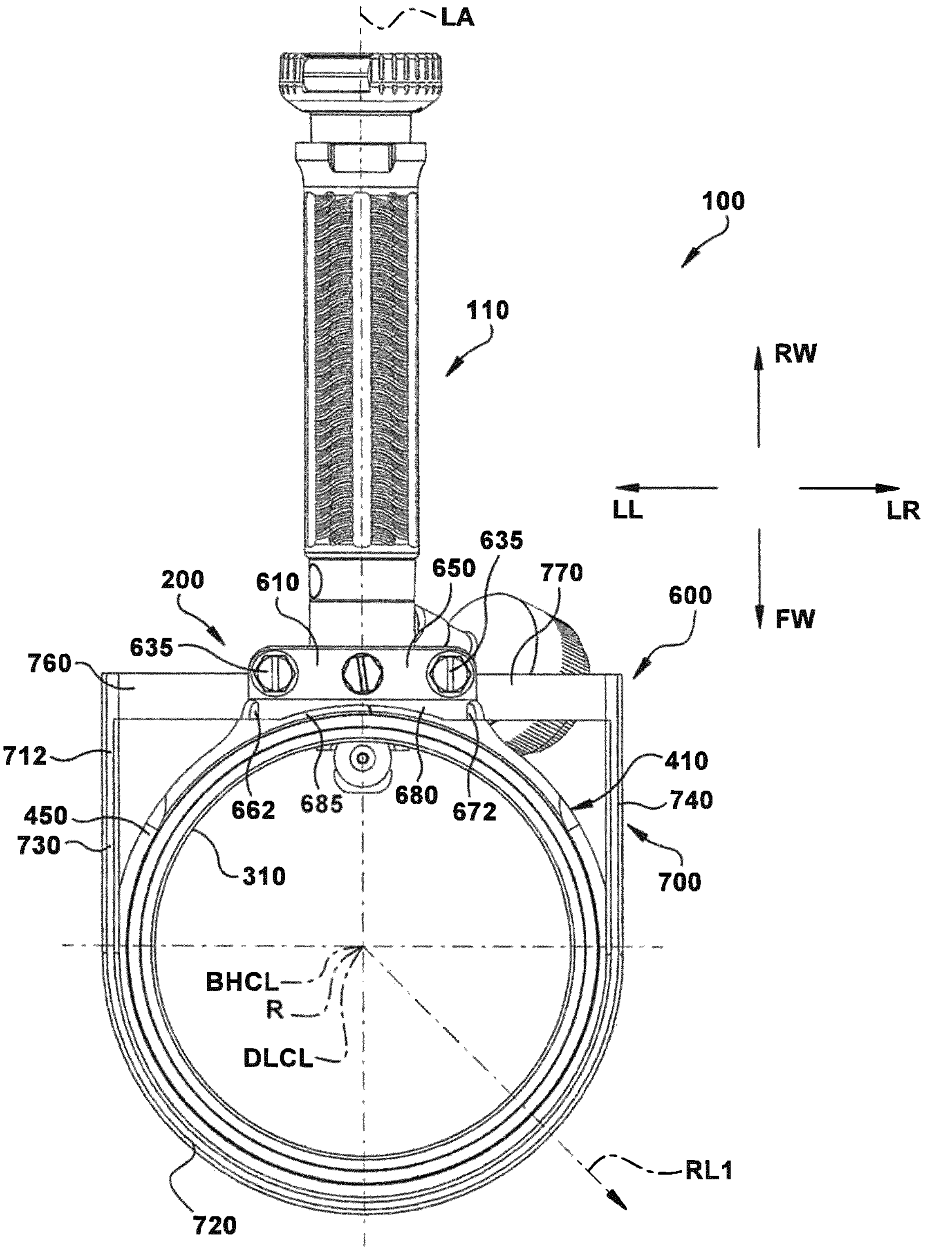
FIG. 4 is a schematic bottom plan view of the power operated rotary knife of FIG. 1.

The split 412 of the split blade housing 410 bisects the mounting section 420 into first and second parts 430, 440 on opposite sides of the split 412. The blade support section 450 of the split blade housing 410 includes, when viewed in top plan view, a substantially circular central opening that is centered about a blade housing center line BHCL. As schematically depicted in FIGS. 3-5, when the blade housing 410 is in its first, blade-supporting state or condition, the blade housing center line BHCL is substantially aligned and coincident with the axis of rotation R of the rotary knife blade 300 and is also substantially aligned with and coincident with a depth limiter center line DLCL of the depth limiter 700.

Cam Mechanism 500

Figure 2:
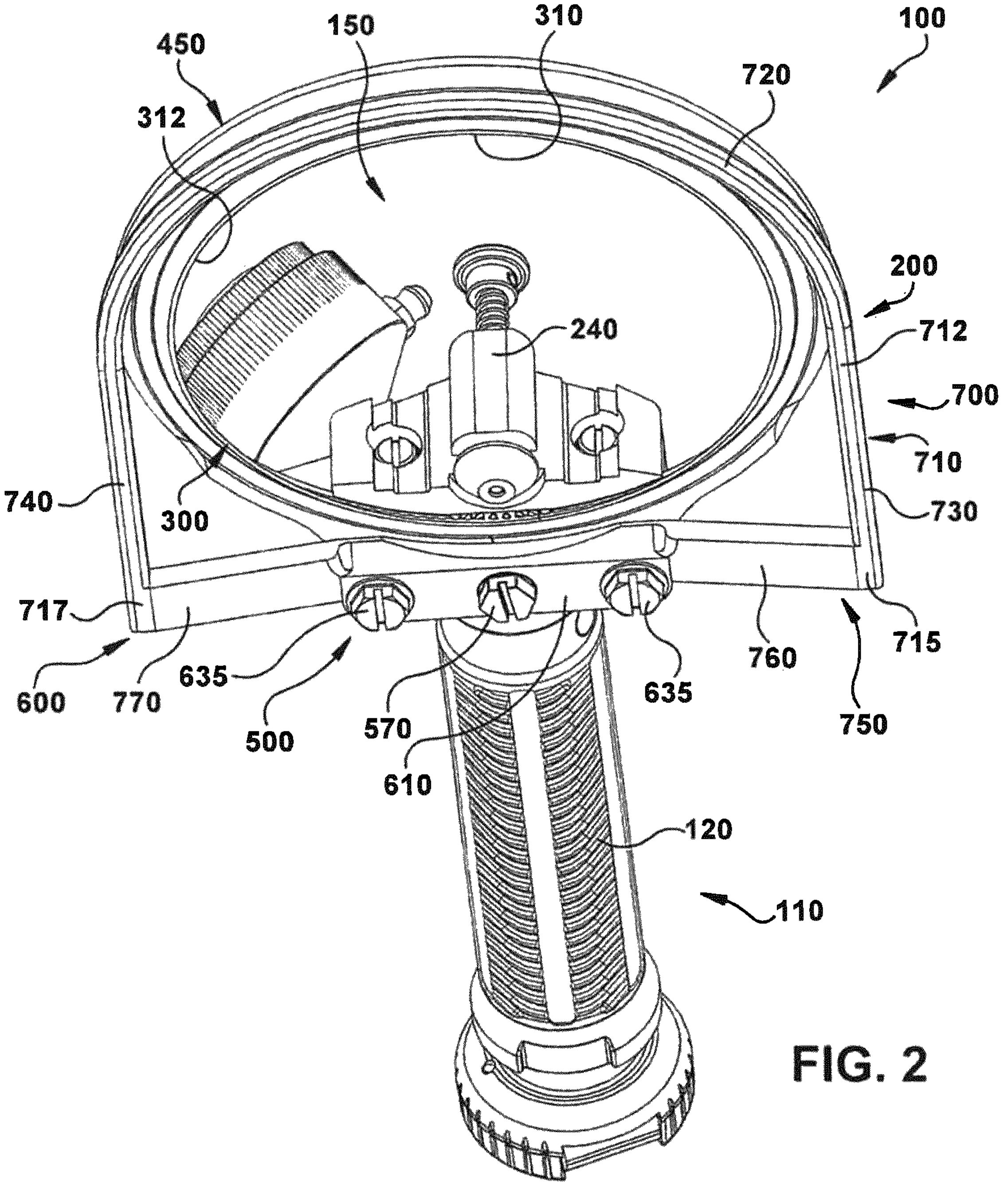
FIG. 2 is a schematic bottom, front perspective view of the power operated rotary knife of FIG. 1.

The blade housing assembly 400 also includes the cam mechanism 500. In one example embodiment, the cam mechanism 500 includes the cam plate 600 and a cam member 550. The cam plate 600 includes, as previously discussed, the central cam cover 610 and the depth limiter 700 which extends laterally and forwardly from the cam cover 610. The cam member 550 includes projections 560 which extend in the upward direction UP and engage respective slots in the facing surface of the mounting section 420 of the blade housing 410. Extending in the opposite axial direction (that is, in the downward direction DW) is a cam actuator 570 which extends though a central opening 620 in the cam cover 610. The cam actuator 570 is rotatable between two positions. In a first position, shown, for example, in FIG. 2, the cam member 550 maintains the split blade housing 410 in the closed or blade-supporting state or condition. In a second position, the cam member 550 is rotated such that the cam member projections 560 move the within the respective slots in the facing surface of the mounting section 420 of the blade housing 410 and thereby causes the split blade housing 410 to move to the open or increased-diameter blade-changing state or condition. This allows for removal of the rotary knife blade 300 from the blade support section 450 of the blade housing 410. When a sharpened or new blade 300 has been reinserted into the blade support section 450 of the blade housing 410, the cam member 550 is rotated back to its first position and the blade housing returns to its blade-supporting state or condition.

Cam Plate 600

In one example embodiment, the cam plate 600 includes the central cam cover 610 and the depth limiter 700 extending therefrom. The cam cover 610 includes a generally planar first or upper surface 640 and an axially spaced apart generally planar second or lower surface 650. The cam cover 610 includes right and left lateral side 660, 670 and forward and rearward facing sides 680, 690 bridging the upper and lower surfaces 640, 650. The function of the cam cover 610 is to hold the cam member 550 in proper position against the mounting section 420 of the split blade housing 410 such that the projections 560 engage respective slots in the facing surface of the mounting section 420. The cam member 550 is rotatable with respect to the cam cover 610 and, thus, the cam actuator 570 extends through the axially extending central opening 620 of the cam cover 610. Moreover, the upper surface 640 includes a cut-out or recess 645 adjacent the central opening 620 and extending through the forward and rearward facing sides 680, 690, which functions as a seating surface for rotation of the cam member 550. The forward facing side 680 of the cam cover 610 also includes a partial arcuate recess 685 adjacent the upper surface 640 for clearance purposes.

Since the cam cover 610 must be stationary with respect to both the cam member 550 and the blade housing mounting section 420, the cam cover 610 includes two additional axially extending openings 630 that flank the central opening 620. The two flanking openings 630, like the central opening 620, extend through the upper and lower surfaces 640, 650. The pair of flanking openings 630 received respective fasteners of a pair of fasteners 635. The pair of fasteners 635 pass through aligned oval openings 432, 442 in the first and second parts 430, 440 of the mounting section 420. The fasteners 635 thread into openings of the frame body mounting pedestal 252 to secure the cam plate 600 and thereby the blade housing 410 to the frame body 210. Essentially, when the fasteners 635 are tightened, the cam cover 610 sandwiches the blade housing mounting section 420 against the frame body mounting pedestal 420 and maintains the cam member 550 in proper position so that the projections 560 of the cam member 550 engage the slots of the blade housing mounting section 420. To change the blade housing between the blade-supporting and the blade-changing states, the pair of fasteners 635 are slightly loosened to facilitate rotation of the cam actuator 570. Upon replacing the rotary knife blade 300 and rotating the cam actuator 570 to return the split blade housing 410 to the blade-supporting state, the pair of fasteners 635 are retightened.

Figure 17:
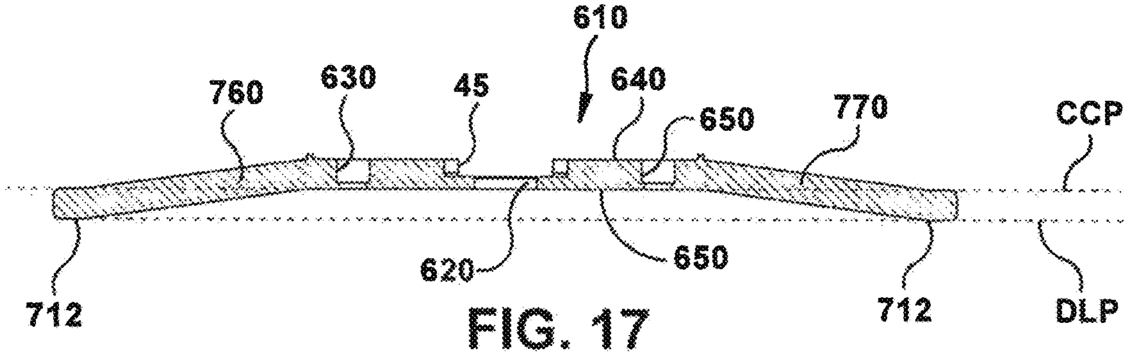
FIG. 17 is a schematic section view of the cam plate with depth limiter of FIG. 7, as seen from a plane indicated by the line 17-17 in FIG. 13.

The depth limiter 700 extends from the cam cover 610 and includes the generally C-shaped working portion 710 that is radially spaced outwardly from the cutting edge 310 of the rotary knife blade 300 and is spaced below the blade cutting plane BCP to achieve the desired depth of cut DC. In one example embodiment, the support portion 750 extends outwardly and downwardly from the right and left lateral sides 660, 670 of the cam cover 610. This is depicted schematically, for example, in FIGS. 8, 11, 15 and 17, wherein the support portion 750 includes first, right and second, left axially downwardly sloping sections or arms 760, 770. The first and second downwardly sloping sections 760, 770 bridge respective transition regions 662, 672 of the right and left lateral sides 660, 670 and respective end regions 715, 717 of the working portion 710. As can be seen in the schematic depiction of FIG. 17, an approximation of an angle of downward slant of the sloping sections 760, 770 can be seen by the axial difference between a dashed line labeled CCP showing the lower surface 650 of the cam cover 610 and a dashed line labeled DLP showing the generally planar carcass contacting surface 712 of the working portion 710 of the depth limiter 700. The working portion 710 of the depth limiter 700, in one example embodiment, includes a pair of straight sections 730, 740 that include the respective end regions 715, 717 of the working portion 710. Extending in curved path between the pair of straight sections 730, 740 is the arcuate section 720. The arcuate section 720 is centered about the depth limiter center line DLCL. As mentioned previously, the depth limiter center line DLCL is aligned and coincident with the rotary knife blade axis of rotation R. That is, the arcuate section 720 of the working portion 710 of the depth limiter 700 is has a larger radius that the radius of the cutting edge 310 of rotary knife blade 300. However, the difference in radius values between the arcuate section 720 and the cutting edge 310 would be substantially the same, as viewed in top plan view and as measure along any given radius line, for example, radius line RL1 in FIG. 4, that starts at the axis of rotation R and passes through the cutting edge 310 of the rotary knife blade 300 and the arcuate section 720 of the working portion 710 of the depth limiter 700.

Figure 14:
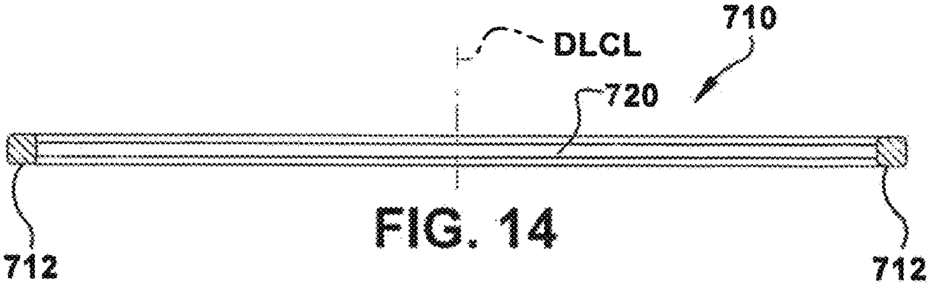
FIG. 14 is a schematic section view of the cam plate with depth limiter of FIG. 7, as seen from a plane indicated by the line 14-14 in FIG. 13.
Figure 15:
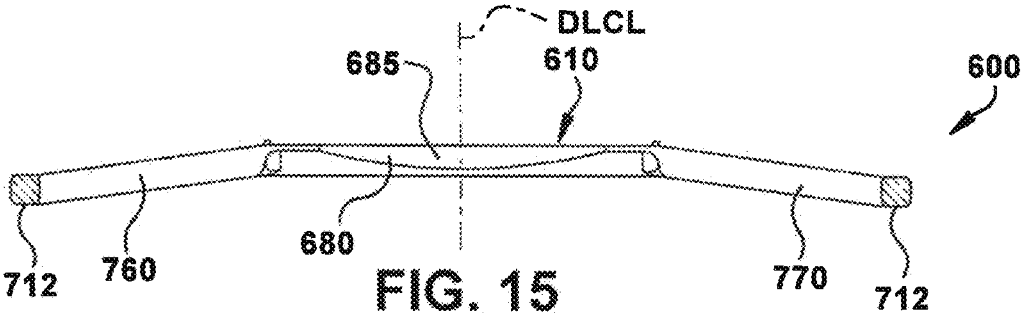
FIG. 15 is a schematic section view of the cam plate with depth limiter of FIG. 7, as seen from a plane indicated by the line 15-15 in FIG. 13.
Figure 16:
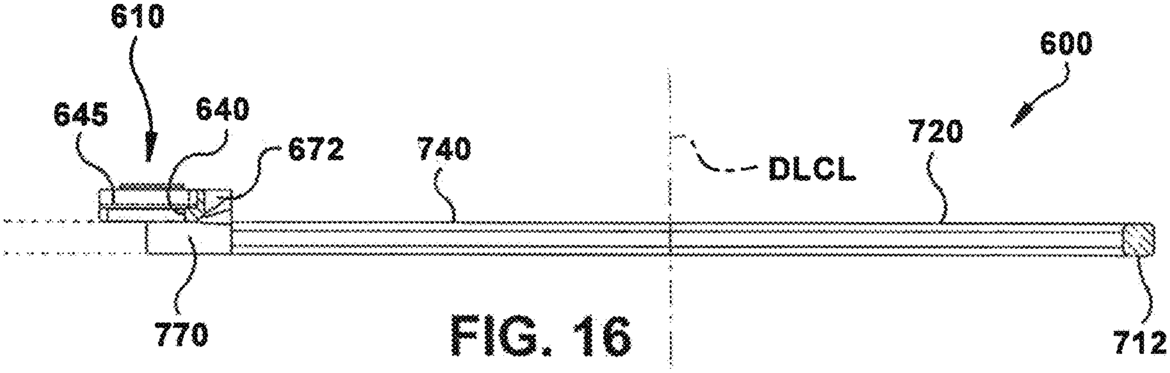
FIG. 16 is a schematic section view of the cam plate with depth limiter of FIG. 7, as seen from a plane indicated by the line 16-16 in FIG. 13.
Figure 18:
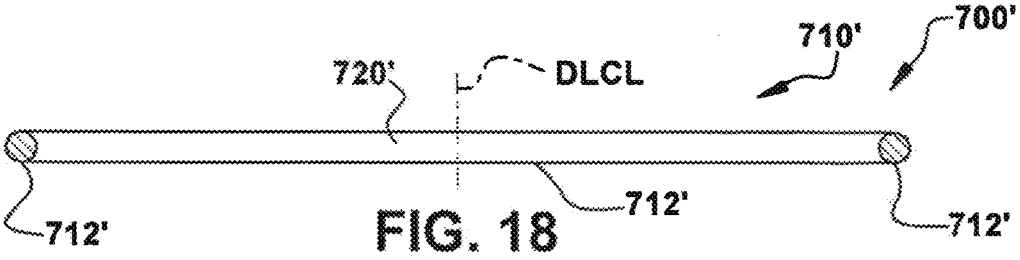
FIG. 18 is a schematic section view of a portion of a working portion of an alternate embodiment of the depth limiter of the present disclosure.

Additionally, in one example embodiment, the C-shaped working portion 710 of the depth limiter 700 is depicted as being substantially square in cross-section (see, for example, the cross-section of the working portion 710 in FIGS. 14 and 16). However, it should be appreciated that the C-shaped working portion of the depth limiter of the present disclosure may have any number of cross-sectional shapes and configurations. For example, in an alternate embodiment, as schematically depicted in FIG. 18, the C-shaped working portion 710' of a depth limiter 700' is a substantially circular cross-section. In the embodiment of the depth limiter 700', the lower or contacting surface 712' is substantially curved or arcuate surface, as opposed to being a substantially planar surface, as was the case with the contacting surface 712 of the depth limiter 700 of the first example embodiment. The depth of cut would be measured from a lower carcass-contacting region of the contacting surface 712' in the depth limiter 700'. An arcuate section 720' of the working portion 710' is schematically depicted in FIG. 18

Figure 9:
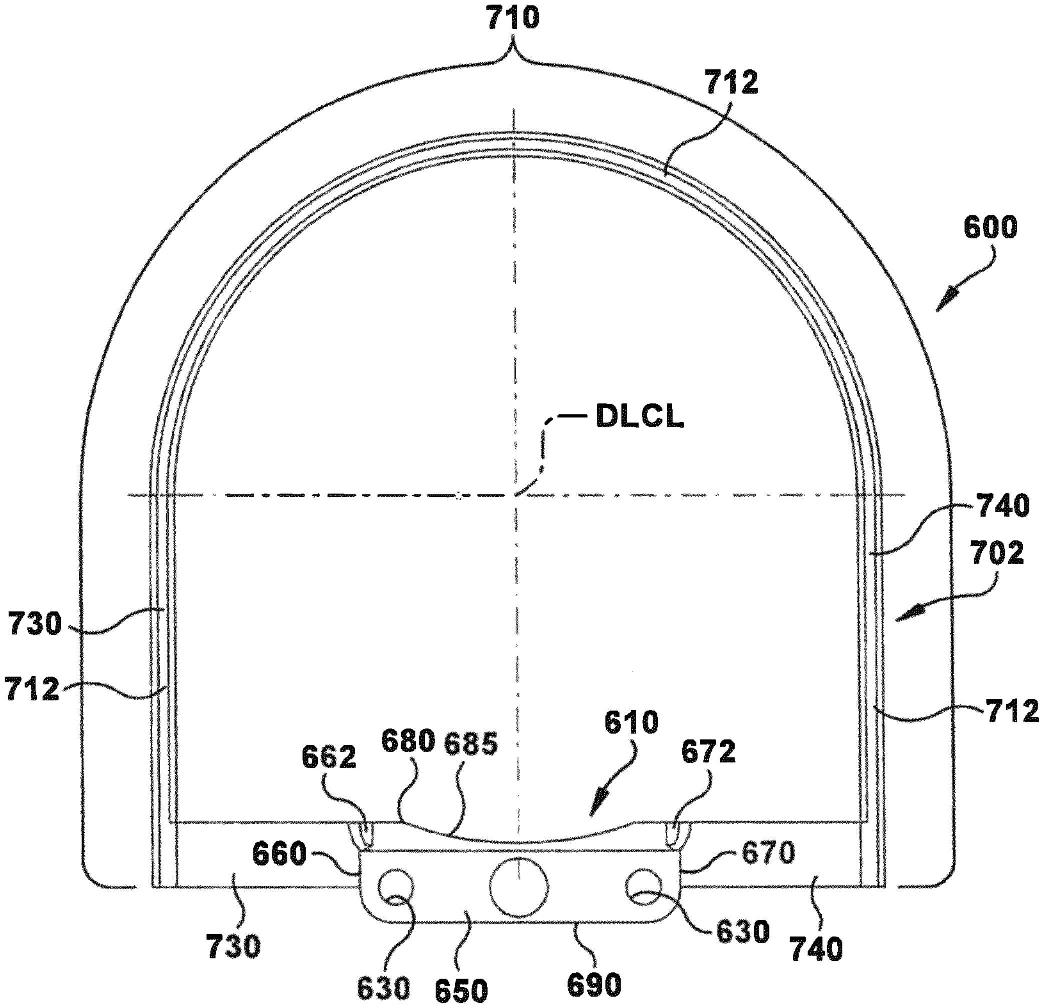
FIG. 9 is a schematic top plan view of the cam plate with depth limiter of FIG. 7, including selected dimensions for one example embodiment.
Figure 10:
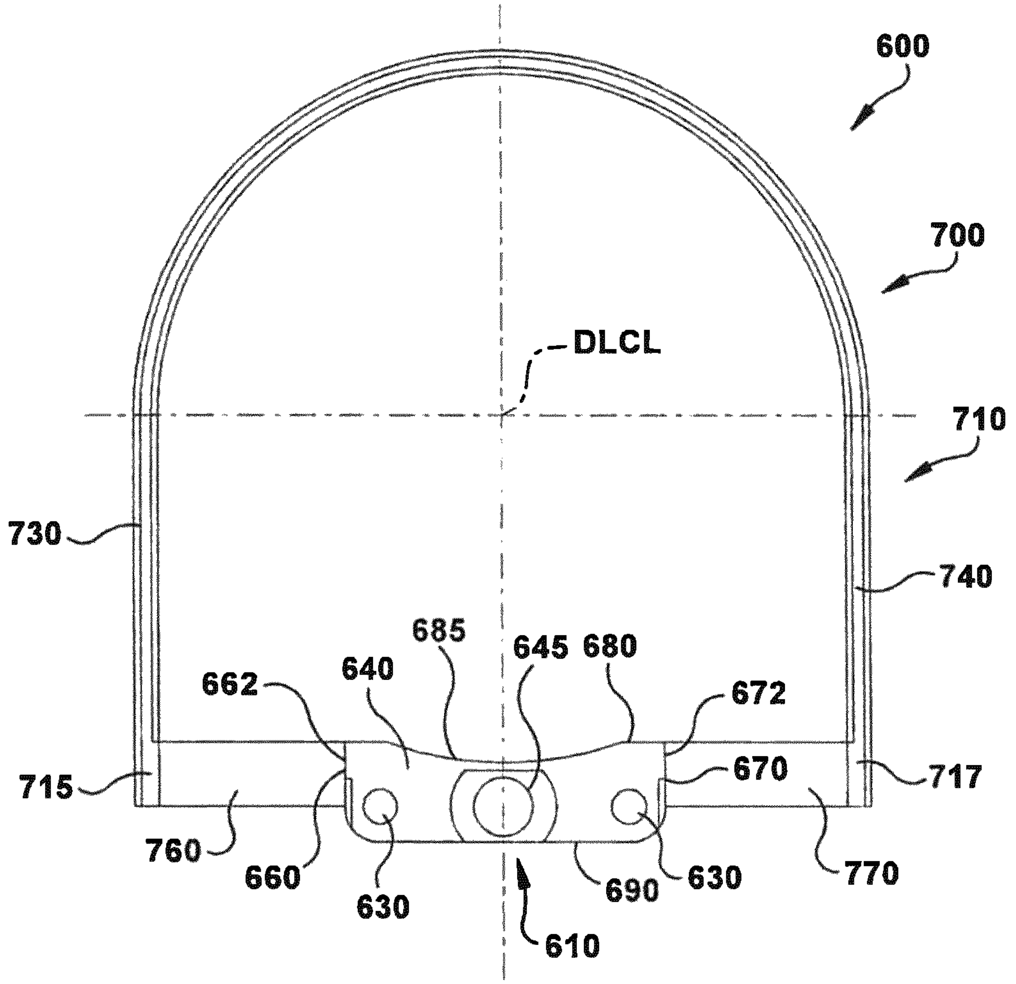
FIG. 10 is a schematic bottom plan view of the cam plate with depth limiter of FIG. 7.
Figure 11:
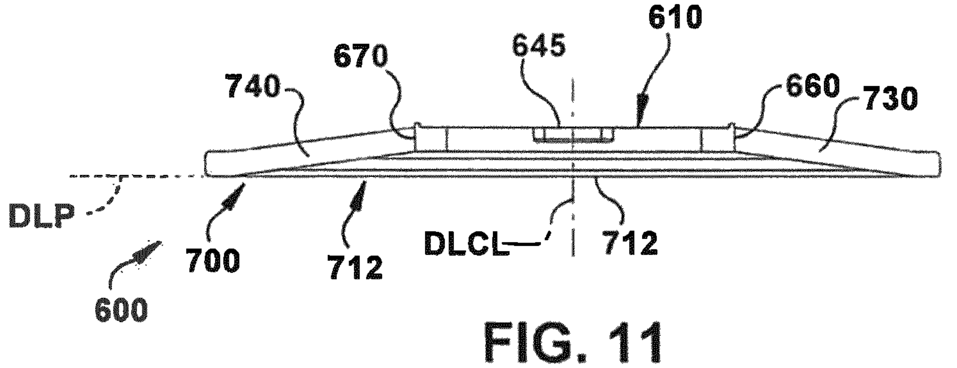
FIG. 11 is a schematic back elevation view of the cam plate with depth limiter of FIG. 7.
Figure 12:
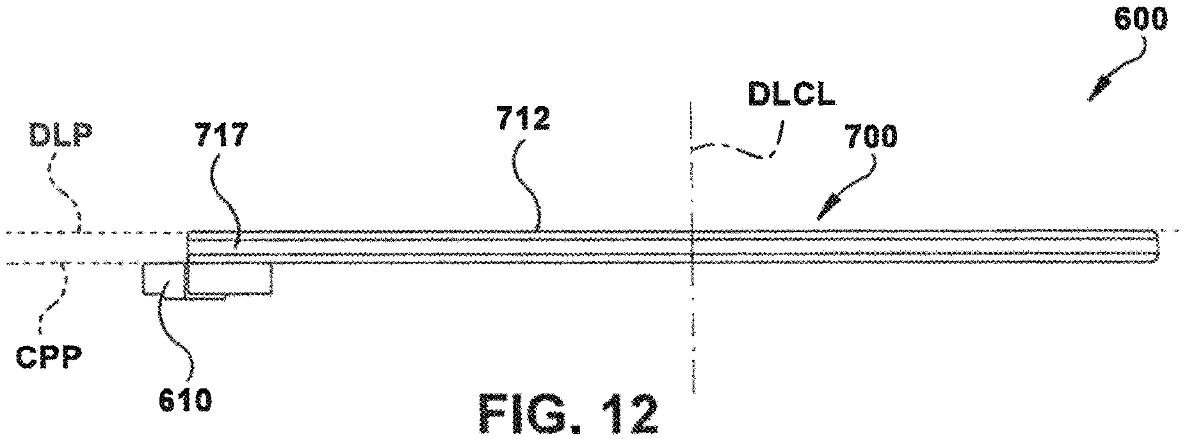
FIG. 12 is a schematic side elevation view of the cam plate with depth limiter of FIG. 7.
Figure 13:
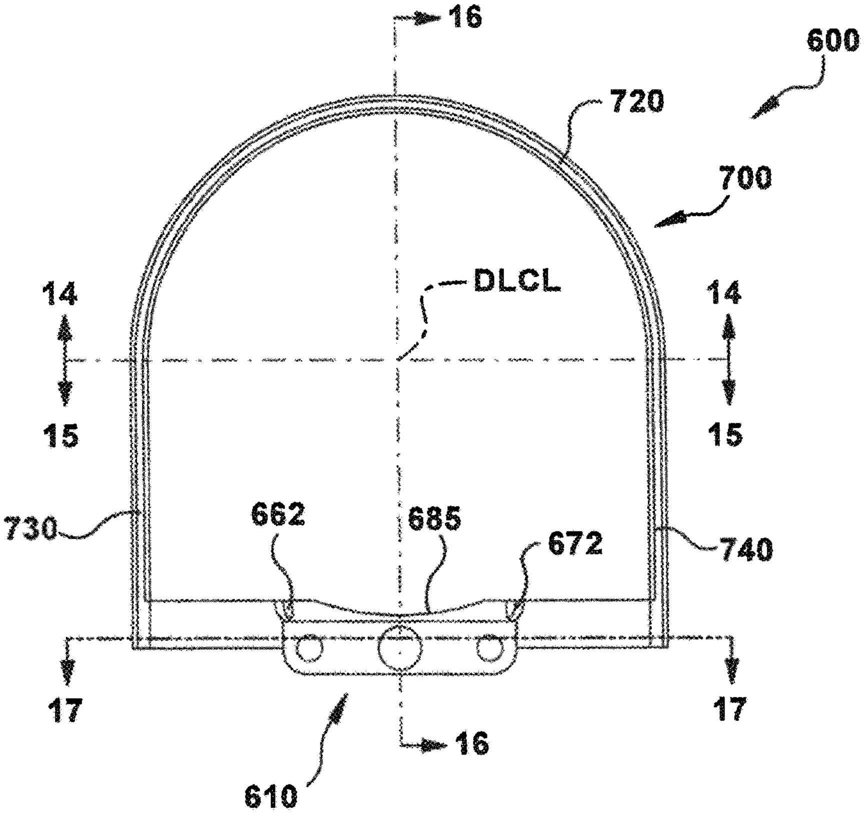
FIG. 13 is a schematic top plan view of the cam plate with depth limiter of FIG. 7 (similar to FIG. 9), but with dimensions removed and cut lines added.

In one example embodiment, the rotary knife blade 300 is a 4 inch diameter blade, that is, having an internal diameter of 4 inches. While certain drawing Figures, for example, FIGS. 9 and 11 of the cam plate 600 includes selected dimensions of one example embodiment of the cam plate 600. It should be appreciated that the cam plate 600 of the present disclosure is not limited to any specific dimensions. Further, specific dimensions of the cam plate 600 will necessarily change depending on a number of factors including, but not limited to, the diameter of the rotary knife blade, the characteristics and properties of the product or carcass that the power operated rotary knife 100 is intended to be used in connection with, the desired depth of cut, and other factors.

As used herein, terms of orientation and/or direction such as upward, downward, forward, rearward, upper, lower, inward, outward, inwardly, outwardly, horizontal, horizontally, vertical, vertically, distal, proximal, axially, radially, east, west, north, south, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A cam plate for a power operated rotary knife, the cam plate comprising:

a cam cover including first and second lateral sides; and a depth limiter including a support portion having first and second sections extending from respective opposite ones of the first and second lateral sides of the cam cover and a working portion including an arcuate section, a lower surface of the working section being spaced below a lower surface of the cam cover.

2. The cam plate of claim 1 where the first and second sections of the support portion of the depth limiter are angled downwardly with respect to the lower surface of the cam cover.

3. The cam plate of claim 1 wherein the working portion of the depth limiter is generally C-shaped.

4. The cam plate of claim 2 wherein the arcuate section of the working portion of the depth limiter extends between a first straight section and a second straight section, the first straight section being affixed to and extending from the first section of the support section and the second straight section being affixed to and extending from the second section of the support section.

5. The cam plate of claim 1 wherein the lower surface of the arcuate section of the depth limiter is spaced below the lower surface of the cam cover.

6. The cam plate of claim 1 wherein the arcuate section of the depth limiter includes a constant radius of curvature.

7. The cam plate of claim 1 wherein a cross section of the support portion of the depth limiter is substantially square.

8. The cam plate of claim 1 wherein a cross section of the support portion of the depth limiter is substantially circular.

9. A power operated rotary knife comprising:

a rotary knife blade including a cutting edge;

a split blade housing supporting the rotary knife blade for rotation about a blade axis of rotation, the blade housing being selectively changeable between a first, blade-supporting state and a second, blade changing state; and a cam mechanism including a cam member and a cam plate, the cam member engaging a mounting section of the split blade housing, the cam member being operable to change a configuration of the split blade housing between the first, blade-supporting state and the second, blade-changing state, the cam plate including:

a cam cover for maintaining engagement of the cam member with the split blade housing, the cam cover including first and second lateral sides; and a depth limiter including a support portion extending from the cam cover and a working portion including an arcuate section, a lower surface of the working portion being spaced radially outwardly of the cutting edge of the rotary knife blade and below the cutting edge of the rotary knife blade.

10. The power operated rotary knife of claim 9 wherein the cam cover of the cam plate of the cam mechanism includes first and second lateral sides and the support portion of the depth limiter of the cam plate of the cam mechanism includes first and second sections extending from respective opposite ones of the first and second lateral sides of the cam cover and the lower surface of the arcuate section of the working portion is spaced below a lower surface of the cam cover.

11. The power operated rotary knife of claim 9 wherein the first and second sections of the support portion of the depth limiter of the cam plate of the cam mechanism are angled downwardly with respect to the lower surface of the cam cover.

12. The power operated rotary knife of claim 9 wherein the working portion of the depth limiter of the cam plate is generally C-shaped, as viewed in plan view.

13. The power operated rotary knife of claim 11 wherein the arcuate section of the working portion of the depth limiter of the cam plate extends between a first straight section and a second straight section, the first straight section being affixed to and extending from the first section of the support section and the second straight section being affixed to and extending from the second section of the support section.

14. The power operated rotary knife of claim 9 wherein the lower surface of the arcuate section of the depth limiter of the cam plate is spaced below the lower surface of the cam cover.

15. The power operated rotary knife of claim 9 wherein the arcuate section of the depth limiter of the cam plate includes a constant radius of curvature.

16. The power operated rotary knife of claim 9 wherein a cross section of the support portion of the depth limiter of the cam plate is substantially square.

17. The power operated rotary knife of claim 9 where a cross section of the support portion of the depth limiter of the cam plate is substantially circular.

18. A cam mechanism of a power operated rotary knife including a cam plate and a cam member, the cam member adapted to engage a split blade housing of a power operated rotary knife and operable to change a configuration of the split blade housing between a first, blade-supporting state and a second, blade-changing state, the cam mechanism comprising:

the cam member;

the cam plate including:

a cam cover engaging the cam member, the cam cover including first and second lateral sides; and a depth limiter including a support portion having first and second sections extending from respective opposite ones of the first and second lateral sides of the cam cover and a working portion including an arcuate section, a lower surface of the working section being spaced below a lower surface of the cam cover.

19. The cam mechanism of claim 17 wherein the support portion of the depth limiter of the cam plate of the cam mechanism includes first and second sections extending from respective opposite ones of the first and second lateral sides of the cam cover and the lower surface of the arcuate section of the working portion is spaced below a lower surface of the cam cover.

20. The cam mechanism of claim 17 wherein the arcuate section of the working portion of the depth limiter of the cam plate extends between a first straight section and a second straight section, the first straight section being affixed to and extending from the first section of the support section and the second straight section being affixed to and extending from the second section of the support section.

* * * * *